United States Patent [19]

Gross et al.

[11] Patent Number: 5,378,807
[45] Date of Patent: Jan. 3, 1995

[54] GAMMA-POLY(GLUTAMIC ACID) ESTERS

[75] Inventors: Richard A. Gross, Chelmsford; Stephen P. McCarthy, Tyngsboro; Devang T. Shah, Lowell, all of Mass.

[73] Assignee: University of Massachusetts at Lowell, Lowell, Mass.

[21] Appl. No.: 832,255

[22] Filed: Feb. 7, 1992

Related U.S. Application Data

[63] Continuation-in-part of Ser. No. 742,839, Aug. 8, 1991, abandoned.

[51] Int. Cl.6 .............................................. C07K 7/10
[52] U.S. Cl. .................................... 530/350; 528/328; 528/330; 528/331
[58] Field of Search ................. 530/350; 528/328, 330, 528/331

[56] References Cited

U.S. PATENT DOCUMENTS 4,968,742 11/1990 Lewis et al. ...................... 525/54.1
5,051,185 9/1991 Watanabe et al. .................. 210/635
5,057,302 10/1991 Johnson et al. ...................... 424/1.1

OTHER PUBLICATIONS

Chemical Abstract CA79(9):50045v (1991).
Chem. Abs. CA75(11):74844y (1991).
Roos et al., Int'l J. Pharm., 22(1): 75088 (1984).
Troy, J. Biol. Chem., 248(1): 305-315 (1973).
Troy, J. Biol. Chem., 248(1): 316-324 (1973).

*Primary Examiner*—Lester L. Lee
*Attorney, Agent, or Firm*—Hamilton, Brook, Smith & Reynolds

[57] ABSTRACT

A method is disclosed for significantly diminishing the rate of degradation of naturally-produced γ-PGA in a γ-PGA-producing cell culture. Also, a method is disclosed for significantly decreasing the water solubility coefficient of naturally-produced γ-PGA by forming derivatives of γ-PGA. In addition, a polymer solution is disclosed which includes a polysaccharide component and a γ-PGA component.

2 Claims, 1 Drawing Sheet

GAMMA-POLY(GLUTAMIC ACID) ESTERS

GOVERNMENT SUPPORT

This invention was made with support from the Government, which has certain rights in the invention.

RELATED APPLICATION

This application is a continuation-in-part application of prior Ser. No. 07/742,839, filed Aug. 8, 1991, the contents of which are incorporated herewith by reference.

BACKGROUND OF THE INVENTION

γ-Poly(glutamic acid) (hereinafter "γ-PGA") is a polymer which is biodegradable. However, the utility of γ-PGA has been limited. For example, synthetic methods typically result in a γ-PGA polymer, or corresponding side chain ester derivatives, having a molecular weight of less than about 10,000, which significantly limits the utility, such as theological or mechanical utility, of the polymer. See, Kovacs et al., *Canad. J. Chem.*, 47: 3670 (1969); Hardy et al., *J. Chem. Soc.*, 6: 605 (1972); Honda et al., *Macromol. Chem.*, 176: 1643 (1978). Also, γ-PGA is typically water-soluble, which limits the utility of this material in both environmental and medical applications.

One attempt to increase the molecular weight of γ-PGA has been to ferment a bacteria, *Bacillus licheniformis*, which releases a naturally-produced γ-PGA into the fermentation broth. However, naturally-produced γ-PGA degrades over time, thereby significantly diminishing the molecular weight of naturally-produced γ-PGA which can be recovered.

Therefore, a need exists for a method of forming γ-PGA and derivatives thereof which overcome the aforementioned problems.

SUMMARY OF THE INVENTION

The present invention relates to a method for significantly diminishing the rate of degradation of naturally-produced γ-PGA in a γ-PGA-producing cell culture. The invention also relates to a method for significantly decreasing the water solubility coefficient of naturally-produced γ-PGA. In addition, the invention relates to derivatives of naturally-produced γ-PGA and to solutions of γ-PGA and polysaccharides.

The method for significantly diminishing the rate of degradation of naturally-produced γ-PGA includes inoculating a first feed volume with an inoculum, the inoculum including γ-PGA-producing bacteria, to form a γ-PGA-producing cell culture. The γ-PGA-producing cell culture is combined with a second feed volume, the second feed volume being present in an amount sufficient to significantly diminish the rate of degradation of the naturally-produced γ-PGA in the γ-PGA-producing cell culture. The γ-PGA-producing cell culture and the second feed volume are incubated, thereby significantly diminishing the rate of degradation of the naturally-produced γ-PGA in the γ-PGA-producing cell culture.

The method for significantly decreasing the water solubility coefficient of a naturally-produced γ-PGA includes directing the γ-PGA into an organic medium, whereby a γ-PGA solution is formed. A basic component is directed into the γ-PGA solution in an amount sufficient to cause a substantial portion of the carboxylic groups of the γ-PGA to form carboxyl salt groups. This γ-PGA solution is combined with a reactant, the reactant including a molecular group which, following reaction of the reactant with the carboxyl salt groups of the γ-PGA, form side groups of the γ-PGA which cause the water solubility coefficient of the γ-PGA to significantly decrease. The γ-PGA solution and the reactant are exposed to conditions sufficient to cause the reactant to react with the γ-PGA, whereby the hydrophobic side groups of the γ-PGA are formed, thereby significantly decreasing the water solubility coefficient of the naturally-produced γ-PGA.

The derivative of a naturally-produced γ-PGA has the empirical formula of:

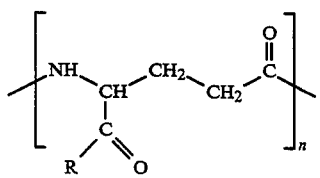

where "R" includes a molecular group which causes the derivative to have a water solubility coefficient which is significantly less than that of naturally-produced γ-PGA and where "n" is a number having a value of between about one thousand and eight thousand. The solution of the invention includes a polysaccharide component and a γ-PGA component.

This invention has many advantages. For example, the rate of degradation of naturally-produced γ-PGA in γ-PGA-producing cell cultures can be significantly diminished. Significantly increased amounts of high-molecular weight γ-PGA can thereby be produced by each γ-PGA-producing cell culture. Also, γ-PGA derivatives can be formed which have significantly reduced solubility in aqueous media. Further, solutions of polysaccharides and γ-PGA polymers can be formed.

These γ-PGA polymers and solutions can be employed in a wide variety of applications. For example, the γ-PGA polymers and solutions can be employed to encapsulate orally-delivered drugs. Also, substantially water-insoluble biodegradable articles can be formed, such as adhesives and packaging materials. Further, polysaccharides, such as starch, which are typically difficult to solubilize, can be dissolved in γ-PGA to form biodegradable polymer solutions which are suitable for widely-varying applications, such as for forming films and biodegradable articles.

DETAILED DESCRIPTION OF THE INVENTION

Figure 1:
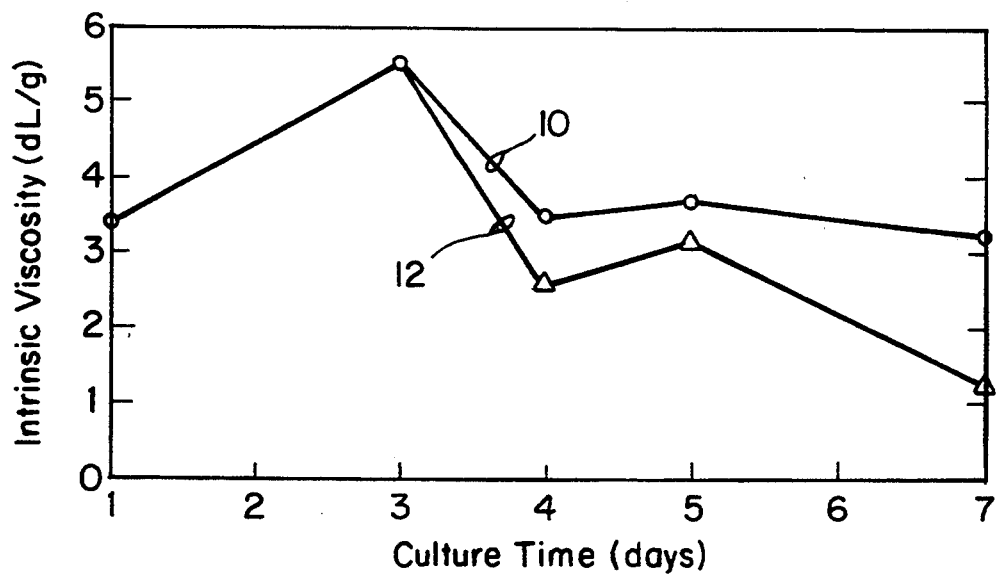
FIG. 1 is a plot of the intrinsic viscosity of purified γ-PGA produced by *B. licheniformis* which has received a second feeding in comparison to that of a control cell culture which has not received a second feeding.

The features and other details of the invention, either as steps of the invention or as combinations of parts of the invention, will now be more particularly described and pointed out in the claims. It will be understood that the particular embodiments of the invention are shown by way of illustration and not as limitations of the invention. The principle features of the invention may be employed in various embodiments without departing from the scope of the invention.

γ-Poly(glutamic acid) (γ-PGA) includes repeating units of glutamic acid that are linked between alpha-amino and γ-carboxylic acid functional groups of the glutamic acid. γ-PGA has the following structural formula:

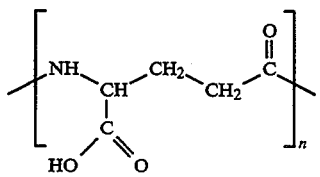

where "n" is in the range of between about one thousand and eight thousand.

A salt of the γ-PGA has the following structural formula:

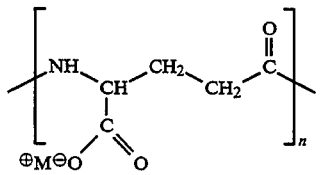

where "n" is in the range of between about one thousand and about eight thousand and "M" can be, for example, a suitable metal, such as sodium.

In the method for significantly diminishing the rate of degradation of naturally-produced γ-PGA in a γ-PGA-producing cell culture, a first feed volume is inoculated with a suitable inoculum which includes γ-PGA-producing bacteria. The inoculum is prepared by a suitable method. In one embodiment, a suitable γ-PGA-producing bacteria is suspended in a suitable feed solution. An example of a suitable γ-PGA-producing bacterium is *B. licheniformis*, obtained from the American Type Tissue Collection (hereinafter "ATCC"), such as ATCC 9945a *B. licheniformis*. An example of a suitable feed solution for supporting the cell culture is a modified Medium E feed solution, such as that disclosed in Leonard, et al., *J. Bacteriol.* 76:499 (1958), the teachings of which are incorporated herein by reference. The Medium E feed solution is modified in that it does not include calcium salt or manganese salt components.

The suspension of bacteria in the feed solution is combined with a larger volume of feed solution and incubated by a suitable method. Stock culture plates are then prepared. Additional sterile modified Medium E feed solution is inoculated with an isolated mucoid colony from the stock culture plate and subsequently incubated to form the inoculum.

A first feed volume is prepared. An example of a suitable first feed volume is sterile Medium E feed solution. The first feed volume is then inoculated with the inoculum. In one embodiment, about one hundred milliliters of sterile Medium E is inoculated with about 1.5 milliliters of inoculum.

The inoculum is incubated in the first feed volume to form a cell culture which produces γ-PGA. In one embodiment, the cell culture is incubated in the first feed volume for a period of time sufficient to cause growth of the cell culture to essentially stop. Preferably, the period of incubation of the cell culture in the presence of the first feed volume is about three days.

The cell culture is combined with a second feed volume. An example of a suitable second feed volume is a solution which includes the same components as the sterile Medium E feed solution, with the exception of phosphate salts, but having a concentration of components which is about five times that of the sterile Medium E feed solution. The amount of the components in the second feed volume is sufficient to cause the rate of degradation of the γ-PGA by the cell culture to significantly diminish relative to cell cultures which are identically treated but which have not been combined with a second feed volume.

The cell culture is subsequently incubated. The conditions under which the cell culture in the second feed volume are incubated are, preferably, the same as the conditions of incubation prior to addition of the second feed volume to the cell culture. The rate of degradation of the γ-PGA by the cell culture following the second feeding is significantly diminished relative to that of cell cultures which have been treated identically over the same time period, but which have not been combined with a second feed volume.

Alternatively, the second feed volume can be added to the cell culture before the growth of the cell culture in the first feed volume essentially stops. For example, the second feed volume can be added continuously to the cell culture during incubation of the cell culture in the first feed volume. In another embodiment, the second feed volume is added intermittently to the cell culture. During either continuous or intermittent addition, the second feed volume is added to the cell culture at a rate which substantially prevents the concentration of feed components to which the cell culture is exposed from becoming toxic to the cell culture.

The resultant γ-PGA is then isolated from the medium in which it is suspended by a suitable method. An example of a suitable method includes centrifugation to separate the cells from the medium, followed by precipitation of the γ-PGA from the resulting supernatant. The precipitate can then be isolated and subsequently lyophilized to remove residual solvent.

A method of significantly decreasing the "water solubility coefficient" of a naturally-produced γ-PGA includes the step of directing the γ-PGA into an organic medium, whereby a γ-PGA solution is formed. Preferably, the γ-PGA is first isolated from a γ-PGA-producing cell culture by a suitable method, such as the method described above, and then purified.

An example of a suitable method of purifying the isolated γ-PGA polymer is by formation of a solution of crude γ-PGA which has been isolated by the method described above. The solution is then purified and concentrated with a suitable tangential-flow filtration apparatus to remove relatively low-molecular weight impurities. The resulting, relatively high-viscosity concentrate, is then acidified to a pH of about 1.5 by combining the concentrate with a suitable acid solution. The γ-PGA is then precipitated out of solution by adding a suitable amount of n-propanol. The resulting precipitate is then exposed to reduced pressure to thereby remove a substantial portion of residual solvent from the γ-PGA precipitate. Alternatively, the γ-PGA can be isolated and purified by employing ion exchange chromatography.

The γ-PGA precipitate is then dissolved in a suitable solvent, such as dimethyl sulfoxide (DMSO). The resulting solution is then combined with a basic component, the amount of basic component being sufficient to cause a substantial portion of the carboxylic groups of the γ-PGA to form carboxyl salt groups. An example of a suitable basic component is sodium bicarbonate (NaHCO₃).

The γ-PGA solution is then combined with a suitable reactant which can react with the carboxyl salt groups of the γ-PGA salt. The reactant includes a molecular group which, following reaction of the reactant with the carboxyl salt groups of the γ-PGA, form side groups of the γ-PGA which cause the water solubility coefficient of the γ-PGA to significantly diminish. "Water solubility coefficient," as that term is used herein, means the volume of water per total volume of polymer and water wherein the water has been absorbed by the polymer. A significantly reduced water solubility coefficient means that the volume of water which can be absorbed by a unit volume of polymer is significantly reduced.

Examples of suitable reactants are halide-substituted n-alkyl molecular groups having the empirical formula $X\text{-}(CH_2)_nCH_3$, where "n" is in the range of between about zero and eleven, and where "X" is a halide substituent, preferably an iodo- or bromo-substituent. Other suitable reactants can include branched alkyl molecular groups. Specific examples of suitable molecular groups for reaction with the carboxyl salt groups of the γ-PGA salt include: benzyl; naphthyl; and liquid crystalline and non-linear optical structures, such as phenyl benzoate and azomethine π-extended hyperpolarizable structures, respectively. Examples of other suitable molecular groups for forming the side groups include amines and mesogenic groups. A preferred molecular group is a 2,2-dimethyl-1,3-dioxolane-4-methyl group. It is to be understood that the γ-PGA salt can be reacted with compositions which include more than one reactant. For example, the carboxyl salt groups of the γ-PGA salt can react with a composition which include a first reactant that includes a first molecular group, such as an alkyl group, and a second reactant that includes a second molecular group, such as an amine. The resulting γ-PGA derivative will consequently include both alkyl and amine side groups.

In one embodiment, the isolated and purified γ-PGA can be reacted with sodium bicarbonate to form a γ-PGA salt which includes carboxyl salt groups. The γ-PGA salt is then exposed to an alkyl halide reactant, which reacts with a significant portion of the carboxyl salt groups of the γ-PGA salt to form alkyl side chains. The alkyl side chains cause the water solubility coefficient of the γ-PGA to significantly decrease. Alternatively, the reactant can include an aromatic component, whereby reaction of the reactant with a significant portion of the carboxyl salt groups of the γ-PGA causes the formation of aromatic ester side chains on the γ-PGA which significantly decreases the water solubility coefficient of the γ-PGA. In addition to including a molecular group which significantly decreases the water solubility coefficient of the γ-PGA, the reactant includes a suitable "leaving substituent," which allows the functional group to react with the carboxyl salt group of the γ-PGA and thereby form a derivative of the naturally-produced γ-PGA which includes covalently-linked side chains of the molecular group. Examples of suitable leaving substituents include halides.

In a preferred embodiment, the γ-PGA is dissolved in a suitable solvent, such as dimethylsulfoxide (DMSO) or hexamethylene phosphoramide (HMPA). Sodium bicarbonate is then added to the solution in an amount sufficient to cause a substantial portion of the carboxylic groups of the γ-PGA to form carboxyl salt groups. A five molar excess of the molecular group of the alkyl halide is then added to the DMSO reaction medium which includes the γ-PGA salt. Bromo- or iodo-substituent molecular groups are particularly preferred. The γ-PGA salt solution and alkyl halide are then exposed to a suitable temperature, such as a temperature in the range of between about 25° C. and 65° C. for a period of time sufficient to cause a significant portion of the carboxyl salt groups of the γ-PGA to react with the alkyl halide, whereby an alkyl ester derivative of the γ-PGA is formed. The water solubility coefficient of the γ-PGA is significantly reduced by reaction with the alkyl halide. In a particularly preferred embodiment, the dissolved γ-PGA salt is reacted with either n-propyl, n-pentyl or benzyl bromide for a period of time of about forty-eight hours at a temperature of about 45° C. to form an alkyl/aralkyl ester derivative.

The general equation for one embodiment of the reaction between the dissolved γ-PGA salt and an alkyl halide is shown below:

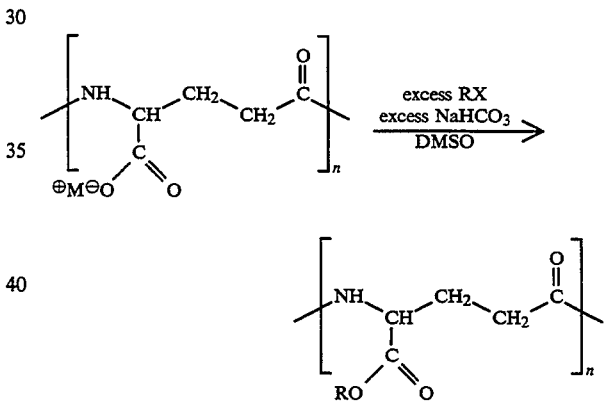

where "n" is in the range of between about one thousand and about eight thousand, "R" is an alkyl component and "X" is a halide or other suitable leaving substituent group and "M" is a suitable ion, such as a sodium ion. It is to be understood, however, that the "R" can be another suitable molecular group for bonding with the γ-PGA, such as those containing branched or linear alkyl structures, aromatic structures, mesogenic structures and non-linear optical structures, as described above.

Alternatively, derivatives of naturally-produced γ-PGA can be formed by taking Dicyclohexyl carbodiimide (DCC) and 4-N,N-Dimethyl aminopyridine (DMAP) with an alcohol or an amine of a desired substituent, along with γ-PGA-H, to give the corresponding α-ester or α-amide derivative of γ-PGA, respectively. See, for example, Hassner et al., *Tetrahedron Lett.*, 4475 (1978), the teachings of which are incorporated herein by reference.

In another embodiment, synthesis of an activated ester, such as the N-hydroxysuccinimide ester of γ-PGA could be carried out as a first step using DCC and DMAP, and this could be followed by reaction with a desired substituent, such as t-butyl alcohol or t-butyl amine, to give the α-t-butyl ester derivative of the α-t-butyl amide derivative of γ-PGA, respectively.

The alkyl-γ-PGA is then precipitated from solution by a suitable method. In one embodiment, distilled water, the pH of which has been adjusted to about two with hydrochloric acid (HCl), is added to the reaction mixture in an amount sufficient to form a precipitate of the alkyl-γ-PGA. The alkyl-γ-PGA precipitate is then further purified by a suitable extraction method and dried by a suitable method. An example of a suitable purification method is a "Soxhlet" solvent extraction using a suitable solvent, such as acetone, ether, etc. A suitable method for drying the extracted precipitate is exposure of the extracted precipitate to a temperature of about 55° C. and at an absolute pressure in the range of between about two and ten millimeters of mercury.

The polymer solution of the invention includes a polysaccharide component and a γ-PGA component. An example of a suitable polysaccharide component is starch. An example of γ-PGA component is a γ-PGA or a γ-PGA derivative formed by the method of the invention. The polymer solution is formed by suitably combining the polysaccharide component and the γ-PGA component. An example of a suitable method of suitably combining the polysaccharide component and the γ-PGA component is by manually stirring the components together with water at a sufficient temperature and for a sufficient period of time to form a solution. The water is then removed by a suitable method, such as by evaporation, to thereby cause the γ-PGA and polysaccharide components to become dissolved in each other.

The invention will now be further and specifically described by the following examples. All parts and percentages are by weight unless otherwise stated.

EXAMPLE I

A freeze-dried sample of *B. licheniformis* (ATCC 9945a) was obtained from the U.S. Department of Agriculture, Peoria, Ill. The sample was suspended in 0.5 ml of modified Medium E: containing neither manganese salts nor calcium salts. This suspension was transferred to one hundred milliliters of modified Medium E and then incubated on a rotary-shaker at 250 rpm and at a temperature of 37° C. for forty-eight hours to form a cell culture. Four stock culture plates were prepared from this cell culture using modified Medium E medium which had been supplemented with 1.5% agar. These culture plates were then incubated at 37° C. for forty-eight hours.

One hundred mL of sterile modified Medium E in a 250 mL Erlenmeyer flask was inoculated using an isolated mucoid colony from a stock culture plate. This culture was incubated on a rotary shaker at 250 rpm and at a temperature of 37° C. for forty-eight hours to form an inoculum for the polymer-producing cell culture. 1.5 ml aliquots of this inoculum were introduced into 500 ml Erlenmeyer flasks, each of which contained 100 mL of sterile modified Medium E having a pH of about 7.4. For a time-course study, multiple culture flasks were prepared taking 100 mL aliquots of Medium E from a larger volume. The cultures, inoculated in an identical manner, were incubated on a rotary shaker at 250 rpm and a temperature of 37° C. These cultures were then interrupted and analyzed at different time points.

A solution which contained five times the initial concentration of the Medium E components, but not containing phosphate salts, was prepared and filter-sterilized. A control solution, which included only double-distilled water, was also filter-sterilized. Twenty milliliters of each solution were added to five culture flasks that had been incubated for three days to bring the culture volumes to 120 mL. This gave five culture flasks which had been given additional nutrients after a three day growth period, along with five control cultures.

At specific time intervals, culture flasks were removed from the incubator-shaker and their contents were poured into a blender containing 50 gms of ice. The interior walls of the culture flasks were rinsed with distilled water and transferred to the blender. The resulting mixture was then blended for two minutes and centrifuged at 16,000 rpm at a temperature of 6° C. for ten minutes to separate the cells from the medium. The cells were washed three times with distilled water which had been warmed to 40° C. The washed cells were subsequently dried (40° C., 5 mm Hg, 24 hours) to obtain the cellular dry weight.

The supernatant resulting from centrifugation which contained the γ-PGA was poured into three volumes of 95% ethanol which had been previously cooled to −20° C. The resulting γ-PGA precipitate, which was defined as the crude product, was isolated by twining it around a glass rod and, subsequently, the crude product was lyophilized to remove any remaining solvent from the crude γ-PGA.

A 3.5% solution of the crude γ-PGA was further purified and concentrated using a Pelican tangential flow apparatus, commercially available form Millipore Co., Inc., which had been fitted sequentially with 0.45μ and 20,000 molecular weight cut-off cartridges, respectively. The concentrate, which had a relatively high viscosity, was acidified to a pH of approximately two with aqueous HCl at 5° C. and precipitated into three volumes of n-propanol to obtain the corresponding free acid derivative, H-γ-PGA.

The crude γ-PGA samples obtained at day five had a purity of approximately 50%. Most of the impurities were low molecular weight substances which were easily removed by filtration.

Intrinsic viscosity [η] measurements in dimethylsulfoxide at 25° C. are plotted in the figure for purified γ-PGA isolated from the cell culture which was given a second feeding by the method of the invention (curve 10) and from the control cell culture (curve 12). Intrinsic viscosity [η] is directly related to polymer molecular weight by the relationship $[\eta]=KM^a$, where "K" is a constant, "M" is viscosity-average molecular weight and "a" is an exponent. As can be seen in FIG. 1, the intrinsic viscosity values for purified γ-PGA produced by the cell cultures which were given a second feeding were significantly higher than the average intrinsic viscosity values of γ-PGA produced by the corresponding control cell cultures. Although the mechanism of the invention is not completely understood, the significant increase in the intrinsic viscosity, and therefore, the average molecular weight, is believed to be due to an inhibition in the activity of depolymerase enzyme(s) as a result of addition of a second feeding at day three.

Derivatives were formed from the isolated γ-PGA. The procedure used to form the derivatives was a modification of that described previously by Bocchi et al., *Synthesis*, 961 (1979). Due to the poor solubility of Na-γ-PGA in dimethylsulfoxide (DMSO), the free acid form (H-γ-PGA) was dissolved in DMSO and to this solution was added a two molar excess of sodium bicarbonate ($NaHCO_3$) and a five molar excess of n-propyl bromide. The reaction was allowed to continue for forty-eight hours at 45° C. after which the product was precipitated into a 6% sodium chloride acidified aqueous solution. The precipitate was further purified by Soxhlet solvent extraction with acetone and ether, and then dried under vacuum.

Peak integration of the n-propyl ester γ-PGA derivatives, based on NMR spectra, showed that at least 90% of the repeat units contained the n-propyl ester pendant groups. In addition, the n-propyl ester γ-PGA derivative of the naturally-produced γ-PGA showed no apparent solubility in water at a pH of about 7, while naturally-produced γ-PGA had a solubility, under the same conditions, of about two grams of naturally-produced γ-PGA per one hundred milliliters of water. Therefore, formation of the γ-PGA derivative significantly reduced the water solubility coefficient of the naturally-produced γ-PGA.

EXAMPLE II

Figure 2:
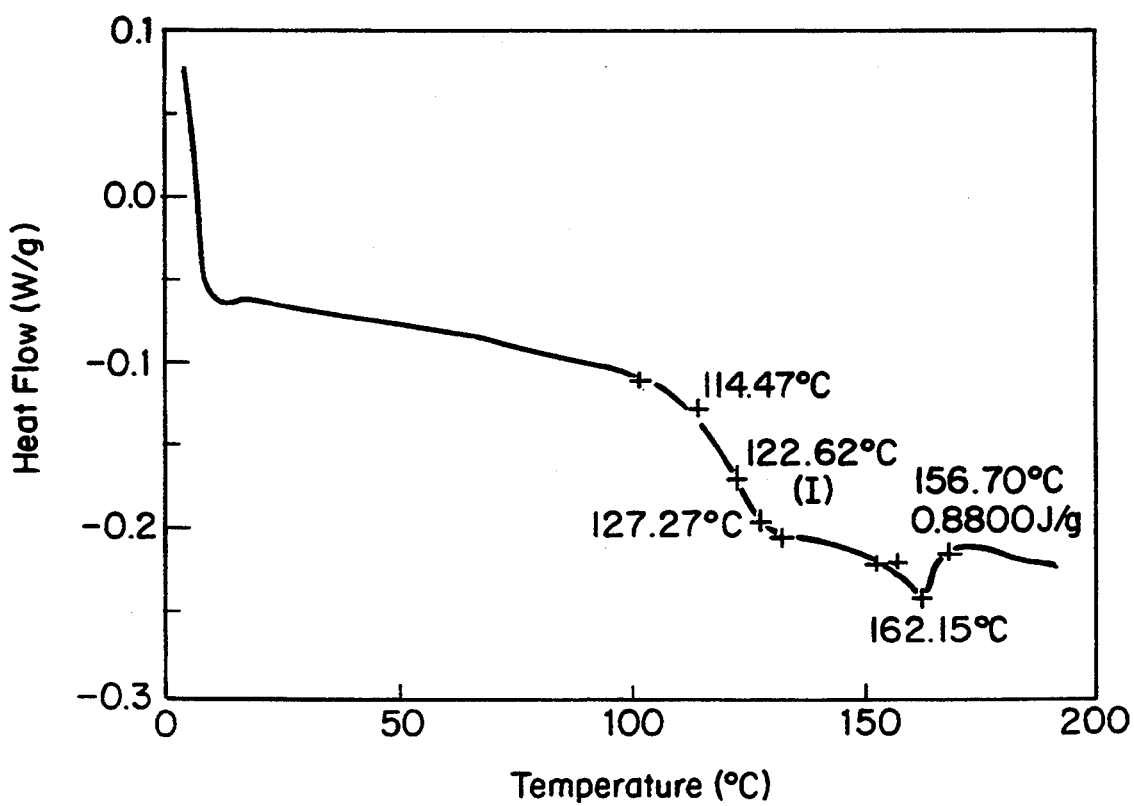
FIG. 2 is a plot of heat flow, in Watts per gram of a solution of naturally-produced γ-PGA and starch over a temperature range from about zero to two hundred degrees Celsius.

Naturally-produced γ-PGA was dissolved in water at about room temperature to form an aqueous solution of about five percent γ-PGA, by weight. Starch was then blended with the aqueous solution in an amount sufficient to form a solution which included about equal weights of dissolved starch and γ-PGA. A film, which was a solution of the naturally-produced γ-PGA and starch, was cast from the solution and a Differential Scanning Calorimeter ("DSC") analysis was performed on the films. Results of the DSC analysis are shown in FIG. 2, which is a plot of heat flow, in Watts per gram of solutio, over a range of temperature from about zero to about two hundred degrees Celsius. As can be seen in FIG. 2, the film had a single glass transition temperature, at about 122° C., which indicates that a solution of the naturally-produced γ-PGA and starch was formed.

EQUIVALENTS

Those skilled in the art will recognize, or be able to ascertain using no more than routine experimentation, many equivalents to the specific embodiments described specifically herein. Such equivalents are intended to be encompassed in the scope of the following claims.

We claim:

1. An ester derivative of naturally-produced γ-PGA, the ester derivative having an empirical formula of:

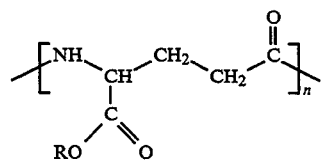

wherein "R" a molecular group which causes the derivative to have a water solubility coefficient which is less than that of naturally-produced γ-PGA and where "n" is a number in the range of between about one thousand and eight thousand.

2. The ester derivative of claim 1, wherein "R" can be at least one n-alkyl, branched alkyl, aryl or aryl-substituted alkyl molecular group.

* * * * *

UNITED STATES PATENT AND TRADEMARK OFFICE
CERTIFICATE OF CORRECTION

PATENT NO. : 5,378,807
DATED : January 3, 1995
INVENTOR(S) : Richard A. Gross, Stephen P. McCarthy and Devang T. Shah It is certified that error appears in the above-identified patent and that said Letters Patent is hereby corrected as shown below:

In Claim 1, column 10, line 24, after "R" insert the word --includes--

Signed and Sealed this

Second Day of May, 1995

BRUCE LEHMAN

Attest:

Attesting Officer

Commissioner of Patents and Trademarks